US005187002A

United States Patent [19]

Egashira et al.

[11] Patent Number: 5,187,002

[45] Date of Patent: Feb. 16, 1993

[54] ELECTROTHERMAL TRANSFER SHEET

[75] Inventors: Noritaka Egashira; Naoto Satake; Masanori Akada, all of Tokyo, Japan

[73] Assignee: Dai Nippon Insatsu Kabushiki Kaisha, Japan

[21] Appl. No.: 490,592

[22] PCT Filed: Sep. 21, 1989

[86] PCT No.: PCT/JP89/00961

§ 371 Date: May 18, 1990

§ 102(e) Date: May 18, 1990

[87] PCT Pub. No.: WO90/03274

PCT Pub. Date: Apr. 5, 1990

[30] Foreign Application Priority Data

Sep. 24, 1988 [JP] Japan .............................. 63-239440
Apr. 17, 1989 [JP] Japan .............................. 1-95257

[51] Int. Cl.[5] ........................ B32B 51/16; B41M 5/26

[52] U.S. Cl. .................................... 428/195; 428/207; 428/209; 428/408; 428/323; 428/337; 428/913

[58] Field of Search ................ 428/207, 195, 209, 408

[56] References Cited

U.S. PATENT DOCUMENTS 4,103,066 7/1978 Brooks et al. .
4,684,563 8/1987 Hayashi et al. .
4,833,021 5/1989 Shimura et al. ............... 428/207 X

FOREIGN PATENT DOCUMENTS 0033364 8/1981 European Pat. Off. .
0099228 1/1984 European Pat. Off. .

OTHER PUBLICATIONS

Resistive Ribbon Thermal Transfer Printing, Ribbon and Head Requirements, W. Crooks et al., Journal of Imaging Technology, vol. 12, No. 2, Apr. 1986, pp. 106-110.

E-Beam Curable Formulations for the Resistive Ribbon of Thermal Transfer Printing, L. S. Chang et al., IBM Technical Disclosure Bulletin, vol. 25, No. 78, Dec. 1982, p. 3700.

*Primary Examiner*—P. C. Sluby
*Attorney, Agent, or Firm*—Parkhurst, Wendel & Rossi

[57] ABSTRACT

The electrothermal transfer sheet of the present invention comprises a substrate sheet, at least one resistor layer formed on one surface of the substrate sheet and a dye layer comprising a heat-migratable dye and a binder, which is formed on the other surface of the substrate sheet. This transfer sheet is characterized in that at least one resistor layer has a positive resistance-temperature coefficient, the ratio $R_{100}/R_{25}$ of the resistance value ($R_{100}$) at 100° C. to the resistance value ($R_{25}$) at 25° C. in the resistor layer is at least 1.2 and the ratio $R_{200}/R_{100}$ of the resistance value ($R_{200}$) at 200° C. to the resistance value ($R_{100}$) at 100° C. in the resistor layer is at least 2.5. By maintaining these resistance-temperature characteristics, heat fusion bonding can be effectively prevented at the printing operation, and the printing sensitivity and image quality can be improved.

17 Claims, 1 Drawing Sheet

ELECTROTHERMAL TRANSFER SHEET

TECHNICAL FIELD

The present invention relates to a thermal transfer sheet. More particularly, the present invention relates to an electrothermal transfer sheet utilized for the thermal transfer system of the electrical transfer process.

BACKGROUND ART

As the thermal transfer sheet utilized in the electrical transfer process where heat is generated by applying an electric current from an electrode head and the transfer is effected by this heat, there has been adopted a structure in which a resistor layer generating heat by an electric current supplied from an electrode head is formed on one surface of a substrate sheet and a dye layer containing a dye that can migrate under heating and can be transferred to a receipt sheet, such as a sublimable dye, is formed on the other surface of the substrate sheet, and a structure in which electroconductive fine particles are incorporated into a substrate sheet to cause the substrate sheet per se to act also as a resistor layer and a layer of a dye as mentioned above is formed on one surface of the sheet.

Most of resistance values of these resistor layers have, in general, a negative temperature coefficient or a temperature coefficient of zero, and even if the resistance values have a positive temperature coefficient, the value of the positive temperature coefficient is small. Accordingly, at the time of generation of heat by application of an electric current, with elevation of the temperature, the resistance value is reduced and super heating is caused by flowing of an increased electric current, or even if the resistance value is not reduced, an effect of controlling an excessive elevation of the temperature is insufficient. Therefore, problem such as fusion sintering of the thermal transfer sheet or breaking of the thermal transfer sheet are often occur.

Furthermore, in case of a thermal transfer sheet of this type, if long-run transfer is carried out, the electrode head is often deteriorated by the friction between the electrode head and the resistor layer. Moreover, a higher transfer energy is required for the thermal transfer sheet of the sublimation type than for a thermal transfer sheet of the fusion type, and therefore, the temperature of the resistor layer by generation of heat becomes much higher, with the result that heat fusion bonding is caused between the electrode head and the resistor layer, and insufficient transfer or insufficient running often occurs.

DISCLOSURE OF THE INVENTION

It is therefore a primary object of the present invention to provide an electrothermal transfer sheet in which the temperature of a resistor layer can be easily controlled, the heat resistance is high, heat fusion bonding to an electrode head is not caused, the slip to the electrode head is good and such troubles as insufficient transfer and insufficient running do not occur.

According to the present invention, this object can be attained by an electrothermal transfer sheet comprising at least one resistor layer formed on one surface of a substrate sheet and a dye layer comprising a heat-migratable dye and a binder, which is formed on the other surface of the substrate sheet, or comprising a substrate sheet acting also as a resistor layer and said dye layer formed on one surface of the substrate sheet, wherein at least one resistor layer has a positive temperature coefficient of the resistance, the ratio $R_{100}/R_{25}$ of resistance value ($R_{100}$) at 100° C. to the resistance value ($R_{25}$) at 25° C. in said resistor layer is at least 1.2 and the ratio $R_{200}/R_{100}$ of the resistance value ($R_{100}$) at 100° C. to the resistance value ($R_{200}$) at 200° C. in said resistor layer is at least 2.5.

Furthermore, in the present invention, by using a resin crosslinkable by ionizing radiation or heat as the resin constituting the resistor layer, the heat resistance of the resistor layer can be improved.

If the resistor layer has such resistance-temperature characteristics and heat resistance, heat fusion bonding is effectively prevented at the printing operation, and the printing sensitivity and image quality can be improved.

BEST MODE FOR CARRYING OUT THE INVENTION

Embodiments of the present invention will now be described in detail with reference to the accompanying drawings.

Figure 1:
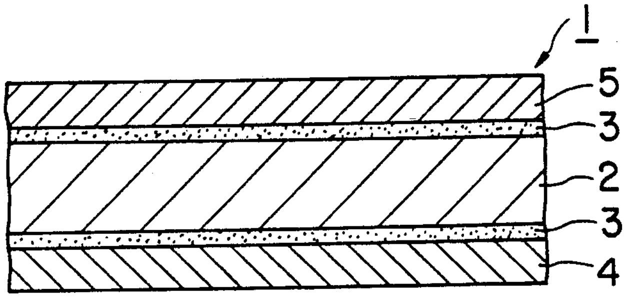
FIGS. 1 through 3 are sectional views illustrating diagrammatically embodiments of the electrothermal transfer sheet of the present invention.

In FIG. 1, reference numeral 1 represents an electrothermal transfer sheet, which comprises a substrate sheet 2, a dye layer 4 formed on one surface of the substrate sheet 2, if necessary through an adhesive layer 3, and a resistor layer 5 laminated on the other surface of the substrate sheet 2.

The substrate sheet 2 gives certain rigidity and heat resistant to the entire electrothermal transfer sheet 1 and is composed of a polyester film, a polystyrene film, a polypropylene film, a polysulfone film, an aramid film, a polycarbonate film, a polyvinyl alcohol film, a cellophane or the like, preferably a polyester film. The thickness is 1.5 to 25 μm, preferably 3 to 10 μm.

In the electrothermal transfer sheet of the present invention, the resistor layer 5 has a positive resistance-temperature coefficient (the property that the resistance value of the resistor layer increases with elevation of the temperature), and the electrothermal transfer sheet of the present invention is characterized in that the ratio $R_{100}/R_{25}$ of the resistance value ($R_{100}$) at 100° C. to the resistance value ($R_{25}$) at 25° C. in the resistor layer is at least 1.2 and the ratio $R_{200}/R_{100}$ of the resistance value ($R_{200}$) at 200° C. to the resistance value ($R_{100}$) at 100° C. in the resistor layer is at least 2.5. Preferably, the heat resistance of the resistor layer is improved by using a resin crosslinkable by ionizing radiation or heat as the resin constituting the resistor layer. If the resistor layer has such resistance-temperature characteristics and heat resistance, heat fusion bonding can be effectively prevented at the printing operation, and the printing sensitivity and image quality can be improved.

If the ratio $R_{100}/R_{25}$ of the material constituting the resistor layer is lower than 1.2 or the ratio $R_{200}/R_{100}$ is lower than 2.5, at the printing by an electrode head, an energy excessive over the energy necessary for the sublimation of the dye is applied to the resistor layer of the electrothermal transfer sheet, and appropriate control of the energy becomes difficult, with the result that heat fusion bonding is unavoidably caused between the resistor layer and the electrode head.

The resistor layer having such resistance-temperature characteristics can be formed of a material comprising a resin and electroconductive particles dispersed therein.

Resins curable with the aid of a curing agent under heating can be used as the resin constituting the resistor layer. For example, there can be mentioned a polyester resin, a polyacrylic acid ester resin, a polyvinyl acetate resin, a styrene acrylate resin, a polyurethane resin, a polyolefin resin, a polystyrene resin, a polyvinyl chloride resin, a polyether resin, a polyamide resin, a polycarbonate resin, a silicon resin and a urea resin. Preferably, a combination of polyvinyl butyral and a polyvalent isocyanate, a combination of an acryl polyol and a polyvalent isocyanate, a combination of acetyl cellulose and a titanium chelating agent and a combination of a polyester and an organic titanium compound are used. Carbon black having an average particle size of 0.7 to 2.0 μm in the resistor layer is especially preferably used as the electroconductive particles.

Figure 2:
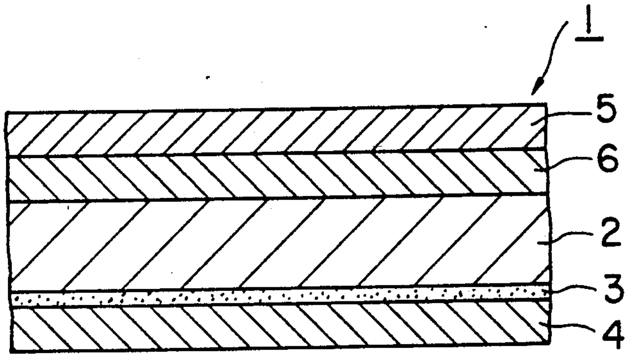

In the electrothermal transfer sheet of the present invention, the number of the resistor layer is not limited to one as in the foregoing embodiment, but two resistor layers 5 and 6 can be formed on the surface of the substrate sheet as shown in FIG. 2, or at least three resistor layers can be formed. The resistor layer 5 in FIG. 2 has the same structure as that of the resistor layer in the embodiment shown in FIG. 1, but the resistor layer 6 can be a resistor not having such characteristics as those of the resistor layer 5. A vacuum deposition metal layer can be mentioned as a specific example of this resistor layer.

Figure 3:
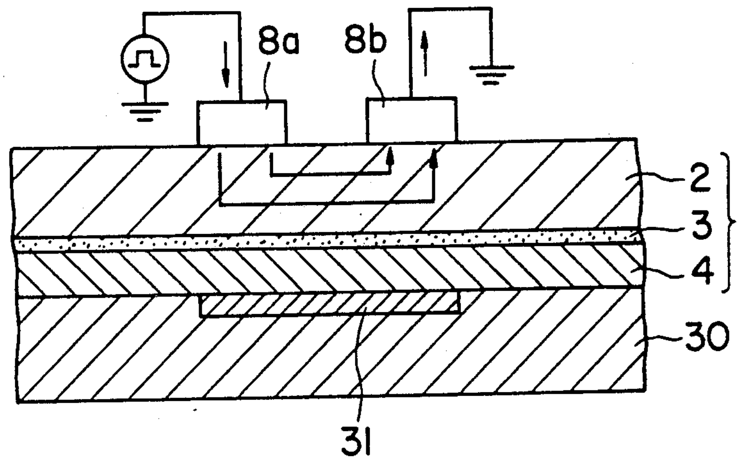

In the present invention, the substrate sheet 2 per se can be a resistor layer, and this embodiment is included in the scope of the present invention. An electrothermal transfer sheet according to this embodiment is shown in FIG. 3. This embodiment will now be described with reference to FIG. 3.

A sheet having certain rigidity and heat resistance is used as the substrate sheet 2 of the type generating heat by allocation of electricity in this embodiment. Namely, the substrate sheet (hereinafter referred to as "sheet of the type generating heat by application of electricity") is composed of a resin having an excellent heat resistance, such as a polyolefin resin, a polystyrene resin, a polyvinyl chloride resin, a polyether resin, a polyamide resin, a silicon resin, a polyvinyl acetate resin or a polycarbonate resin, in which an electroconductive substance such as carbon black or a metal powder, preferably carbon black, is incorporated.

As the carbon black, there can be used, for example, furnace black, acetylene black, ketene black, channel black and thermal black. As the metal powder, there can be mentioned, for example, nickel, copper, iron and silver. Furthermore, powders of metal oxides such as tin oxide, indium oxide, zinc oxide and antimony oxide can be used.

Preferably, carbon black is added in such an amount that respective particles of the carbon black are dispersed separately to some extent from one another in the sheet of the type generating heat by application of electricity. If the distance between particles of the carbon black is too small, an electric current flows very easily and super heating of the sheet of the type generating heat by application of electricity is caused as pointed out hereinbefore, and no good results can be obtained. In view of the foregoing, it is preferred that the carbon black be added in an amount of up to 230 parts by weight, especially 65 to 150 parts by weight, per 100 parts by weight of the resin. Preferably, the resistance value of the sheet of the type generating heat by application of electricity is about 500 Ω/□ to 5 kΩ/□. In this case, the thickness of the sheet of the type generating heat by application of electricity is preferably about 2 to 20 μm.

The resistance-temperature coefficient of the sheet of the type generating heat by application of electricity is the same as described above with respect to the resistor layer.

An adhesive layer 3 is formed between the dye layer 4 and the substrate sheet 2 or the sheet 2 of the type generating heat by application of electricity, or between the substrate sheet and the resistor layer. For example, in case of a substrate sheet having a good adhesiveness to the dye layer, an adhesive layer need not be formed. Furthermore, instead of formation of an adhesive layer, the substrate sheet can be exposed to ionizing radiation by a corona treatment or a plasma treatment. For the adhesive layer, there can be used homopolymers of unsaturated carboxylic acids such as acrylic acid, methacrylic acid and maleic acid, copolymers of these monomers with other vinyl monomer, such as a styrene/maleic acid copolymer, a styrene/(meth)acrylic acid copolymer and a (meth)acrylic acid/(meth)acrylic acid ester copolymer, vinyl alcohol resins such as polyvinyl alcohol, partially saponified polyvinyl acetate and a vinyl alcohol/ethylene/(meth)acrylic acid copolymer, and polyesters and modified polyamides rendered insoluble or hardly soluble in a solvent used for dissolving a dye layer-forming resin at the dye layer-forming step. The thickness of the adhesive layer is preferably about 0.1 to 0.5 μm.

The dye layer can be formed of a resin containing a dye capable of migrating by heat and being transferred to a receipt sheet, such as a sublimable dye. As the resin used for formation of the dye layer, there can be mentioned cellulose resins such as ethyl cellulose, hydroxyethyl cellulose, ethylhydroxy cellulose, hydroxypropyl cellulose, methyl cellulose, cellulose acetate and cellulose butyrate, and vinyl resins such as polyvinyl alcohol, polyvinyl acetate, polyvinyl butyral, polyvinyl acetal, polyvinyl pyrrolidone and polyacrylamide.

Any of dyes customarily used for known thermal transfer sheets, for example, sublimable disperse dyes, sublimable oil-soluble dyes, sublimable basic dyes and other heat-migrating dyes, can be effectively used as the dye to be incorporated into the dye layer in the present invention. For example, there are preferably used red dyes such as Sumiplus Red 301, PTR-51, Celliton Red SF-7864, Sumiplus Red B and Mihara Oil Red, yellow dyes such as PTY-51, ICI-C-5G and Miketon Polyester Yellow YL, and blue dyes such as Kayaset Blue A-2R, Diaresin Blue N, PTB-76 and PTV-54.

Preferably, the amount of the dye is 50 to 120 parts by weight per 100 parts by weight of the resin constituting the dye layer. The thickness of the dye layer is preferably about 0.1 to about 2 μm.

The electrothermal transfer sheet of the present invention is constructed by the above-mentioned materials, and the resistor layer can be formed according to the solvent coating method, the hot melting method or the extrusion coating (EC) method and the sheet of the type generating heat by application of electricity can be formed by a customary resin film-forming method, for example, the extrusion method, the solvent casting method or the inflation method. In the case where ionizing radiation is used, a polyfunctional monomer can be coated without using a solvent as the diluent. The adhesive layer or dye layer can be formed by dissolving or dispersing necessary components in water or an appropriate organic solvent and coating and drying the solution or dispersion.

In the present invention, in forming the resistor layer (including the sheet of the type generating heat by application of electricity), if the formed resistor layer is crosslinked by ionizing radiation, the heat resistance of the resistor layer can be highly improved and heat fusion bonding between the electrode head and the resistor layer can be further controlled.

Ultraviolet rays and electron beams are preferably used as the ionizing radiation for attaining the above object. Ultraviolet rays generated from known ultraviolet ray generators can be used. In the case where ultraviolet rays are used as the ionizing radiation, it is preferred that a photosensitizer, a polymerization initiator, a radical generator and the like be incorporated into the resistor layer in advance.

In the case where electron beams are used as the ionizing radiation, it is preferred that a slip agent be further incorporated into the resistor layer. As the slip agent, there can be mentioned nonionic surface active agents and lubricants.

As the nonionic surface active agent, there can be mentioned alkyl aryl ethers such as polyoxyethylene nonylphenyl ether and polyoxyethylene octylphenyl ether, alkyl ethers such as polyoxyethylene alkyl ether, polyoxyethylene lauryl ether, polyoxyethylene oleyl ether, polyoxyethylene tridecyl ether, polyoxyethylene alkyl ether, polyoxyethylene cetyl ether and polyoxyethylene stearyl ether, alkyl esters such as polyoxyethylene laurate, polyoxyethylene oleate, polyoxyethylene stearate, alkylamines such as polyoxyethylene laurylamine, sorbitan derivative esters such as sorbitan laurate, sorbitan palmitate, sorbitan stearate, sorbitan oleate and sorbitan fatty acid ester, sorbitan derivative composites such as polyoxyethylene sorbitan laurate, polyoxyethylene sorbitan palmitate, polyoxyethylene sorbitan stearate and polyoxyethylene sorbitan oleate, fluorine compounds such as perfluoroalkyl compounds.

The nonionic surface active agent is preferably used in an amount of 10 to 30 parts by weight per 100 parts by weight of the resin constituting the resistor layer.

An organic lubricant is preferably used as the lubricant. For example, there can be mentioned hydrocarbon lubricants such as liquid paraffin, natural paraffin, polyethylene wax and chlorinated hydrocarbons, fatty acid lubricants such as lauric acid, myristic acid, palmitic acid and stearic acid, fatty acid amide lubricants such as stearic amide, stearic-oleic amide, oleic amide, erucic amide and ethylene-bis-stearic amide, ester lubricants such as butyl stearate, cetyl palmitate and stearic monoglyceride, and silicone lubricants such as amino-modified silicone oil, epoxy-modified silicone oil, polyether-modified silicone oil, olefin-modified silicone oil, fluorine-modified silicone oil, alcohol-modified silicone and higher fatty acid-modified silicone oil.

The concentration of the organic lubricant tends to increase in the surface of the resistor layer (the surface on the side falling in contact with the electrode head). Accordingly, the slip-imparting effect is further enhanced by the organic lubricant, and use of the organic lubricant is preferred. In case of an inorganic lubricant, this effect is low because the concentration distribution in the thickness direction is substantially uniform.

Preferably, the lubricant is added in an amount of 10 to 30 parts by weight per 100 parts by weight of the resin constituting the resistor layer.

The so-prepared electrothermal transfer sheet of the present invention is used in the following manner. Namely, a receipt sheet 30 is piled on the surface of the dye layer 4 of the electrothermal transfer sheet 1, and electrode heads 8*a* and 8*b* are brought into contact with the surface of the resistor layer 2. If electricity is applied imagewise, an electric current flows from one electrode 8*a* to the other electrode 8*b* through the resistor layer 2, whereby the resistor layer 2 is heated and by this heat, the dye of the dye layer 4 is allowed to migrate to an image-receiving layer (not shown) of the receipt sheet 30 to form a desired image 31.

A material on which the dye of the dye layer 4 can be adsorbed can be used for the receipt sheet 30. For example, a plastic film or sheet such as a polyester film or sheet can be directly used, and even a paper or a plastic film having a low dye-absorbing property can be similarly used if a dye-receiving layer composed of a resin having a good dye-absorbing property is formed on the surface.

The formed image can be a monocolor or full-color image according to the dye used for the electrothermal transfer sheet.

Any of known electrical printers can be used as the printer, and the kind of the printer is not particularly critical.

The present invention will now be described in detail with reference to the following examples and comparative examples. Incidentally, in the examples, all of "parts" and "%" are by weight unless otherwise indicated.

EXAMPLE 1

A polyethylene terephthalate film having a thickness of 6 μm was used as the substrate sheet, and an adhesive layer having a thickness of 0.3 μm was formed on one surface of the substrate sheet. A resistor layer-forming coating liquid formed by dissolving and dispersing 100 parts of a polyester resin 100 parts of carbon black having an average particle size of 1 μm in the resistor layer and 20 parts of a polyvalent isocyanate in a toluene/MEK (1/1) mixed solvent was coated on the abrasive layer by a wire bar. The coated liquid was dried to form a resistor layer having a thickness of 6 μm. An adhesive layer was similarly formed on the other surface of the substrate sheet, and a dye layer-forming ink having the following composition was coated in an amount of 1 g/$^2$ as in the dry state on the adhesive layer and dried to form a dye layer, whereby an electrothermal transfer sheet of the present invention was obtained.

| Dye layer-forming ink composition | |
|---|---|
| Disperse dye (Kayaset Blue 714 supplied by Nippon Kayaku) | 4 parts |
| Polyvinyl butyral resin (S-Lec BX-1 supplied by Sekisui Kagaku) | 4.3 parts |
| Toluene | 40 parts |
| Methylethylketone | 40 parts |

EXAMPLE 2

A dye layer was formed in the same manner as described in Example 1 and an adhesive layer was formed on the other surface, and a resistor layer-forming coating liquid comprising 100 parts of a polyester resin, 100 parts of carbon black having an average particle size of 1.8 μmin the resistor layer and 20 parts of a polyvalent isocyanate was coated and dried on the adhesive layer to form a resistor layer having a thickness of 6 μm thereby obtaining a transfer sheet of Example 2.

COMPARATIVE EXAMPLE 1

A dye layer was formed in the same manner as described in Examples 1 and 2 and an adhesive layer was formed on the other surface, and a resistor layer-forming coating liquid comprising 100 parts of a polyester resin and 100 parts of carbon black having an average particle size of 0.2 μm in the resistor layer was coated on the adhesive layer and dried to form a resistor layer having a thickness of 6 μm thereby obtaining a transfer sheet of Comparative Example 1.

By using electrothermal transfer sheets, the transfer test was carried out. Namely, in a transfer apparatus used, copper wires having a diameter of about 5 μm and having the top plated with nickel were arranged at intervals of 8 eires/mm as electrode heads as signal electrodes, and plate-shaped electrode heads treated in the same manner as described above were arranged as earth electrodes in parallel to the arrangement direction of the signal electrodes about 0.3 mm apart therefrom. By using this electrothermal transfer apparatus, the transfer was carried out under the following transfer conditions. The results of the observation of the transfer state are shown in Table 1.

Transfer conditions

Pulse width: 1 ms
Recording frequency: 2.0 ms
Recording energy: 3.0 J/cm$^2$.

was irradiated with electron beams to effect a crosslinking treatment, whereby a sheet of the type generating heat by application of electricity, which had a thickness of 15 μm, was obtained. A dye layer was formed on one surface of the obtained sheet through an adhesive layer in the same manner as described in Example 1 to obtain a transfer sheet of Example 3.

EXAMPLE 4

Instead of the sheet of the type generating heat by application of electricity, which was formed in Example 3, a sheet of the type generating heat by application of electricity, which had a thickness of 15 μm, was prepared from a sheet-forming composition comprising 100 parts of a polyvinyl chloride resin, 100 parts by weight of carbon black having an average particle size of 2.0 μm in the resistor layer and 10 parts of a nonionic surface active agent in the same manner as described in Example 3. The obtained sheet was treated with electron beams in the same manner as described in Example 3 to obtain an electrothermal transfer sheet of the present invention.

COMPARATIVE EXAMPLE 2

A comparative electrothermal transfer sheet was prepared in the same manner as described in Example 3 except that the slip agent was not used for the sheet of the type generating heat by application of electricity and the electron beam treatment was not carried out for the formation of the sheet of the type generating heat by electricity.

COMPARATIVE EXAMPLE 3

A comparative electrothermal transfer sheet was prepared in the same manner as described in Example 4

TABLE 1

| | Resistor Layer | | | Surface Resistance Value (Ω/□) | | | Resistance Ratio | | Transfer |
|---|---|---|---|---|---|---|---|---|---|
| | Polyester resin (parts by weight) | Carbon black (parts by weight) | Carbon black Average particle size | Room temperature (25° C.) | 100° C. | 200° C. | $R_{100}/R_{25}$ | $R_{200}/R_{100}$ | State |
| Example 1 | 100 | 100 | 1.0 μm | 230 | 750 | 2250 | 3.26 | 3.00 | Good |
| Example 2 | 100 | 100 | 1.8 μm | 370 | 470 | 1400 | 1.27 | 2.98 | Good |
| Comparative example 1 | 100 | 100 | 0.2 μm | 530 | 570 | 635 | 1.08 | 1.11 | Heat fusion bonding caused |

Note
$R_{25}$: resistance value at 25° C.
$R_{100}$: resistance value at 100° C.
$R_{200}$: resistance value at 200° C.

EXAMPLE 3

A mixture comprising 100 parts of a polyamide resin, 120 parts of carbon black having an average particle size of 1.5 μm in the resistor layer and 10 parts of a silicone lubricant was heated, melted and kneaded to sufficiently disperse the carbon black. The mixture was formed into a sheet by extrusion molding and the sheet except that the electron beam treatment was not carried out for the formation of the sheet of the type generating heat by application of electricity.

By using the above-mentioned electrothermal transfer apparatus, the transfer was carried out under the above-mentioned conditions. The running stability at the transfer step and the transfer state were examined. The obtained results are shown in Table 2.

TABLE 2

| | Composition of Sheet Generating Heat of Application of Electricity | | | Irradiation with Electron Beams | Surface Resistance Value Ω/□ | | | Resistance Ratio | | Running Stability | Transfer State |
|---|---|---|---|---|---|---|---|---|---|---|---|
| | Resin | Carbon black* | Additive | | Room temperature (25° C.) | 100° C. | 200° C. | $R_{100}/R_{25}$ | $R_{200}/R_{100}$ | | |
| Example 3 | Polyamine, 100 | Particle size of 1.5 μm, | Silicone lubricant, 10 parts | Effected | 235 | 308 | 893 | 1.31 | 2.96 | Receipt sheet and transfer sheet run at | No fusion bonding between head |

TABLE 2-continued

| | Composition of Sheet Generating Heat of Application of Electricity | | | Irradiation with Electron Beams | Surface Resistance Value Ω/□ | | | Resistance Ratio | | Running Stability | Transfer State |
|---|---|---|---|---|---|---|---|---|---|---|---|
| | Resin | Carbon black* | Additive | | Room temperature (25° C.) | 100° C. | 200° C. | $R_{100}/R_{25}$ | $R_{200}/R_{100}$ | | |
| | parts | 120 parts | | | | | | | | same speed, good running stability | and transfer sheet, high print quality |
| Example 4 | Polyvinyl acetate, 100 parts | Particle size of 2.0 μm, 100 parts | Nonionic surfactant, 10 parts | Effected | 538 | 689 | 1724 | 1.28 | 2.50 | Receipt sheet and transfer sheet run at same speed, good running stability | No fusion bonding between head and transfer sheet, high print quality |
| Comparative Example 2 | Polyamide, 100 parts | Particle size of 1.5 μm, 120 parts | Not added | Not effected | 278 | 351 | 1008 | 1.26 | 3.10 | Large friction between electrode head and transfer sheet, difficult running of transfer sheet | Fusion bonding, bad transfer state |
| Comparative Example 3 | Polyvinyl acetate, 100 parts | Particle size of 2.0 μm, 100 parts | Nonionic surfactant, 10 parts | Not effected | 571 | 697 | 1813 | 1.22 | 2.60 | No heat resistance of transfer sheet, adhesion to electrode head, difficult running | Fusion bonding, bad transfer state |

Note
*particle size of carbon black in Table 2 is the average particle size in the sheet of type generating heat by application of electricity

EXAMPLE 5

A mixture comprising 100 parts of a polyamide resin, 100 parts of carbon black having an average particle size of 1.0 μm in the resistor layer and 10 parts of a silicone lubricant was heated, melted and kneaded to sufficiently disperse the carbon black, and the mixture was formed into a sheet by extrusion molding and the sheet was crosslinked by irradiation with electron beams to form a sheet of the type generating heat by application of electricity, which had a thickness of 12 μm. A dye layer was formed on one surface of the obtained sheet through an adhesive layer in the same manner as described in Example 1 to obtain a transfer sheet of Example 5.

EXAMPLE 6

A sheet of the type generating heat by application of electricity, which had a thickness of 12 μm, was prepared in the same manner as described in Example 5 except that a mixture comprising 100 parts of a polyvinyl acetate resin, 120 parts of carbon black having an average particle size of 1.5 μm in the resistor layer and 10 parts of a nonionic surface active agent was used as the composition for the formation of the sheet of the type generating heat by application of electricity. In the same manner as described in Example 5, the obtained sheet was irradiated by electron beams and a dye layer was formed thereon to obtain an electrothermal transfer sheet of the present invention.

COMPARATIVE EXAMPLE 4

A comparative electrothermal transfer sheet was prepared in the same manner as described in Example 1 except that a mixture comprising 100 parts of a polyamide resin and 100 parts of carbon black having an average particle size of 2.3 μm in the resistor layer was heated, melted and kneaded to sufficiently disperse the carbon black and the mixture was formed into a sheet by extrusion molding, and the electron beam treatment was not carried out.

COMPARATIVE EXAMPLE 5

A comparative electrothermal transfer sheet was prepared in the same manner as described in Example 6 except that a sheet of the type generating heat by application electricity was formed from 100 parts of a polyvinyl acetate resin, 120 parts of carbon black having an average particle size of 0.4 μm in the resistor layer and 10 parts of a nonionic surface active agent and the electron beam treatment was not carried out.

COMPARATIVE EXAMPLE 6

An electrothermal transfer sheet was prepared in the same manner as described in Comparative Example 5 except that the sheet of the type generating heat by application of electricity, which was obtained in Comparative Example 5, was subjected to the electron beam treatment.

The reactive transfer sheets were subjected to the transfer test under the above-mentioned conditions by using the above-mentioned electrothermal transfer apparatus. The results of the printing test and the changes of the surface resistance value are shown in Table 3.

TABLE 3

| | Composition of Sheet Generating Heat of Application of Electricity | | | Electron Beam Irradiation | Surface Resistance Value Ω/□ | | | Resistance Ratio | | |
|---|---|---|---|---|---|---|---|---|---|---|
| | Resin | Carbon black* | Additive | | Room temperature (25° C.) | 100° C. | 200° C. | $R_{100}/R_{25}$ | $R_{200}/R_{100}$ | Results of Printing Test |
| Example 5 | Polyamide, 100 parts | Particle size of 1.0 μm, 100 parts | Silicone lubricant, 10 parts | Effected | 338 | 411 | 1028 | 1.22 | 2.50 | Resistance value increased by rise of temperature, heat resistance increased by electron beam crosslinking, good transfer image form by supply of necessary transfer energy |
| Example 6 | Polyvinyl acetate, 100 parts | Particle size of 1.5 μm, 120 parts | Nonionic surfactant, 10 parts | Effected | 680 | 824 | 2080 | 1.21 | 2.51 | Resistance value increased by rise of temperature, heat resistance increased by electron beam crosslinking, good transfer image form by supply of necessary transfer energy |
| Comparative Example 4 | Polyamide, 100 parts | Particle size of 2.3 μm, 100 parts | Not added | Not effected | 783 | 869 | 1753 | 1.11 | 2.02 | Small rise of resistance value by rise of temperature, difficult control of energy, heat fusion bonding by friction with head |
| Comparative Example 5 | Polyvinyl acetate, 100 parts | Particle size of 0.4 μm, 120 parts | Nonionic surfactant, 10 parts | Not effected | 1035 | 1142 | 2169 | 1.10 | 1.90 | Difficult control of energy, partial heat fusion bonding |
| Comparative Example 6 | Polyvinyl acetate, 100 parts | Particle size of 0.4 μm, 120 parts | Nonionic surfactant, 10 parts | Effected | 1100 | 1254 | 2380 | 1.14 | 1.90 | Good heat resistance by electron beam crosslinking, difficult control of energy, partial heat fusion bonding |

Note
*particle size of carbon black in Table 3 is the average particle size in the sheet of the type generating heat by application of electricity As is apparent from the results obtained in the foregoing examples and comparative examples, in the electrothermal transfer sheet of the present invention, by using the resistor layer having a positive resistance-temperature coefficient, which is characterized in that the ratio $R_{100}/R_{25}$ of the resistance value ($R_{100}$) at 100° C. to the resistance value ($R_{25}$) at 25° C. is at least 1.2 and the ratio $R_{200}/R_{100}$ of the resistance value ($R_{200}$) at 200° C. to the resistance value ($R_{100}$) at 100° C. is at least 2.5, and also by using a resin which can be crosslinked by ionizing radiation or the like, the temperature can be easily controlled at the printing operation, heat fusion bonding of the transfer sheet to the electrode head does not occur, and since the slip property of the electrode head is good, such problems as insufficient transfer and insufficient running do not occur. Therefore, an excellent electrothermal transfer sheet can be provided according to the present invention.

INDUSTRIAL APPLICABILITY

The electrothermal transfer sheet of the present invention can be widely used in an image-forming system by the image transfer of the type generating heat by application of electricity.

We claim:

1. An electrothermal transfer sheet comprising:

a substrate sheet;

a dye layer comprising a sublimable dye and a binder, said dye layer being formed on one side of said substrate sheet; and at least one resistor layer formed on the other side of said substrate sheet, wherein said at least one resistor layer has a positive temperature coefficient of resistance, a ratio $R_{100}/R_{25}$ of the resistance value, $R_{100}$, at 100° C. to the resistance value, $R_{25}$, at 25° C. in the resistor layer of at least 1.2, and a ratio $R_{200}/R_{100}$ of the resistance value, $R_{200}$, at 200° C. to the resistance value, $R_{100}$, at 100° C. in the resistor layer of at least 2.5.

2. The electrothermal transfer sheet of claim 1, wherein said resistor layer comprises a dispersion of electroconductive particles in a resin.

3. The electrothermal transfer sheet of claim 2, wherein said resin comprises a resin crosslinked by ionizing radiation.

4. The electrothermal transfer sheet of claim 2, wherein said resin comprises a resin crosslinked by heat.

5. The electrothermal transfer sheet of claim 1, wherein said resistor layer comprises a resin and carbon particles, and the content of the carbon particles is not greater than 230 parts by weight based on 100 parts by weight of said resin.

6. The electrothermal transfer sheet of claim 1, wherein said resistor layer comprises a resin and carbon particles, and the content of the carbon particles is between 65–150 parts by weight based on 100 parts by weight of said resin.

7. The electrothermal transfer sheet of claim 1, wherein said resistor layer contains a slip agent.

8. The electrothermal transfer sheet of claim 1, further comprising an adhesive layer formed between said resistor layer and said substrate sheet, or between said substrate sheet and said dye layer.

9. The electrothermal transfer sheet of claim 1, further comprising an adhesive layer formed between said resistor layer and said substrate sheet, and an adhesive layer formed between said substrate sheet and said dye layer.

10. The electrothermal transfer sheet of claim 1, further comprising an adhesive layer formed between said substrate sheet and said dye layer.

11. An electrothermal transfer sheet comprising:

a substrate sheet comprising an electrothermal sheet; and a dye layer comprising a sublimable dye and a binder, said dye layer being formed on one side of said substrate sheet;

wherein said substrate sheet has a positive temperature coefficient of resistance, a ratio $R_{100}/R_{25}$ of the resistance value, $R_{100}$, at 100° C. to the resistance value, $R_{25}$, at 25° C. in the resistor layer of at least 1.2, and a ratio $R_{200}/R_{100}$ of the resistance value, $R_{200}$, at 200° C. to the resistance value, $R_{100}$, at 100° C. in the resistor layer of at least 2.5.

12. The electrothermal transfer sheet of claim 11, wherein said substrate sheet comprises a dispersion of electroconductive particles in a resin.

13. The electrothermal transfer sheet of claim 12, wherein said resin comprises a resin crosslinked by ionizing radiation.

14. The electrothermal transfer sheet of claim 12, wherein said resin comprises a resin crosslinked by heat.

15. The electrothermal transfer sheet of claim 14, wherein said substrate sheet comprises a resin and carbon particles, and the content of the carbon particles is not greater than 230 parts by weight based on 100 parts by weight of said resin.

16. The electrothermal transfer sheet of claim 11, wherein said substrate sheet comprises a resin and carbon particles, and the content of the carbon particles is between 65-150 parts by weight based on 100 parts by weight of said resin.

17. The electrothermal transfer sheet of claim 11, wherein said substrate sheet contains a slip agent.

* * * * *